(12) United States Patent
Satake et al.

(10) Patent No.: US 9,702,601 B2
(45) Date of Patent: Jul. 11, 2017

(54) EXPANSION VALVE AND VIBRATION-PROOF SPRING

(71) Applicant: TGK CO., LTD, Tokyo (JP)

(72) Inventors: Ryosuke Satake, Tokyo (JP); Takeshi Watanabe, Tokyo (JP)

(73) Assignee: TGK CO., LTD, Tokyo (JP)

( * ) Notice: Subject to any disclaimer, the term of this patent is extended or adjusted under 35 U.S.C. 154(b) by 1123 days.

(21) Appl. No.: 13/862,365

(22) Filed: Apr. 12, 2013

(65) Prior Publication Data

US 2013/0283836 A1 Oct. 31, 2013

(30) Foreign Application Priority Data

Apr. 25, 2012 (JP) .................................. 2012-100226
Feb. 21, 2013 (JP) .................................. 2013-032425

(51) Int. Cl.
*F25B 41/04* (2006.01)
*F16F 7/00* (2006.01)
(Continued)

(52) U.S. Cl.
CPC .............. *F25B 41/043* (2013.01); *F16F 7/00* (2013.01); *F25B 41/062* (2013.01); *F16F 1/324* (2013.01);
(Continued)

(58) Field of Classification Search
CPC .... F16F 1/324; F16F 1/027; F16F 1/18; F16F 1/32; F16F 1/368; F16F 3/023;
(Continued)

(56) References Cited

U.S. PATENT DOCUMENTS 3,072,143 A * 1/1963 Fleischhacker ....... F16K 15/026
137/514
4,542,852 A 9/1985 Orth et al. ...................... 236/92
(Continued)

FOREIGN PATENT DOCUMENTS

CN 101101065 A 1/2008 ............... F16K 1/14
DE 3507221 A1 9/1985
(Continued)

OTHER PUBLICATIONS

CN201310122596.8, Notification of the First Office Action, Dispatch Date: Apr. 12, 2016, File No. 2016040701305040, Code No. 529055.
(Continued)

*Primary Examiner* — Jonathan Bradford
(74) *Attorney, Agent, or Firm* — Martine Penilla Group, LLP

(57) ABSTRACT

An expansion valve includes a shaft for transmitting the drive force to a valve element and a vibration-proof spring, set between the body and the shaft, which generates the sliding friction by biasing the shaft. The vibration-proof spring includes a spring body of a hollow tube shape, a spring part, which is integrally formed with a side wall of the spring body, and a bulging portion formed on the spring part in a protruding manner such that the tip of the bulging portion is placed opposite to a part of the shaft. When the bulging portion abuts against the shaft inserted to the vibration-proof spring, the spring part is placed in a position along the spring body or is warped outwardly from the spring body, so that the elastically reactive force resulting from the warped spring part allows the shaft to slide in a stabilized manner.

6 Claims, 8 Drawing Sheets

(51) Int. Cl.
*F25B 41/06* (2006.01)
*F16F 1/32* (2006.01)

(52) U.S. Cl.
CPC ... *F25B 2341/06* (2013.01); *F25B 2341/0683* (2013.01); *F25B 2500/12* (2013.01); *F25B 2500/13* (2013.01)

(58) Field of Classification Search
CPC .. F16F 15/073; F16F 15/1215; F16F 15/1336; F16F 2234/06; F16F 2238/022; F25B 2341/06
USPC .................. 267/161, 163, 158, 160; 188/67
See application file for complete search history.

(56) References Cited

U.S. PATENT DOCUMENTS

| | | | |
|---|---|---|---|
| 2004/0177632 A1 | 9/2004 | Watari et al. | 62/222 |
| 2008/0185452 A1 | 8/2008 | Kobayashi et al. | 236/92 B |

FOREIGN PATENT DOCUMENTS

| | | | |
|---|---|---|---|
| EP | 1457747 A2 | 9/2004 | |
| JP | H04-48480 U | 4/1992 | ............. F16K 47/02 |
| JP | U1199204-48480 | 4/1992 | ............. F16K 47/02 |
| JP | 08-145505 | 7/1996 | ............. F25B 41/06 |
| JP | 2004-162807 | 10/2004 | ............. F16K 31/06 |
| JP | 2004-293779 | 10/2004 | ............. F16K 31/68 |
| JP | 2005-098423 | 4/2005 | ............. F16K 31/06 |
| JP | 2008014628 A | 1/2008 | |
| JP | 2009192198 A | 8/2009 | |

OTHER PUBLICATIONS

CN201310122596.8, Notification of the First Office Action, English Translation, Dispatch Date: Apr. 12, 2016, File No. 2016040701305040, Code No. 529055.

European Search Report issued for European Patent Application No. 13164180.5, dated Nov. 18, 2013.

JP2013-032425, Notice of Reason(s) for Refusal, Dispatch Date: Nov. 11, 2015, Dispatch No. 514439, Ref. No. TGK13-107.

* cited by examiner

EXPANSION VALVE AND VIBRATION-PROOF SPRING

CLAIM OF PRIORITY TO RELATED APPLICATION

The present application is claiming priority of Japanese Patent Application No. 2012-100226, filed on Apr. 25, 2012, the content of which is incorporated herein by reference.

BACKGROUND OF THE INVENTION

1. Field of the Invention

The present invention relates to an expansion valve and, more particularly to a vibration-proof spring suitable in preventing the vibration of an actuating member of the expansion valve.

2. Description of the Related Art

A refrigeration cycle in an automotive air conditioner is generally configured such that it includes a compressor, a condenser, a receiver, an expansion valve, and an evaporator. The compressor compresses a circulating refrigerant. The condenser condenses the compressed refrigerant. The receiver separates the condensed refrigerant into a gas and a liquid. The expansion valve throttles and expands the separated liquid refrigerant and delivers it by turning it into a spray. Then the evaporator evaporates the misty refrigerant and thereby cools the air inside a vehicle by the evaporative latent heat.

Used as the expansion valve is a thermostatic expansion valve which senses the temperature and pressure of refrigerant in an outlet side of the evaporator such that the refrigerant delivered from the evaporator has a predetermined degree of superheat and which controls the flow rate of refrigerant delivered to the evaporator by opening and closing a valve section. This thermostatic expansion valve includes a body formed with a first passage for passing the refrigerant flowing from the receiver to the evaporator and a second passage for passing the refrigerant returning from the evaporator and supplying the refrigerant to the compressor. A valve hole is formed midway in the first passage. And a valve element is provided in a predetermined manner such that the flow rate of refrigerant flowing to the evaporator is regulated by touching and leaving the valve hole. Provided at an end of the body is a power element that senses the temperature and pressure of refrigerant flowing through the second passage and controls the valve opening degree of the valve section. The drive force of the power element is transmitted to the valve section by way of an elongated shaft. The shaft extends in such a manner as to move across the second passage and reaches the first passage and is slidably supported by an insertion hole formed in a partition that separates the first passage from the second passage.

In such an expansion valve as describe above, the pressure may fluctuate in an upstream side where a high-temperature refrigerant is introduced. If this problem of fluctuation is left unattended, the valve element may vibrate and generate noise. In the light of such problems, the following method is often employed. That is, the biasing force of a spring is applied to a shaft from its lateral side so that the valve element does not respond sensitively to the fluctuation in pressure, thereby possibly stabilizing the operation of the valve element. For example, a plurality of plate-like bodies are cut out inwardly from an annular section of a support ring, thereby producing a vibration-proof spring (see Reference (1) in the following Related Art List, for instance). Also, as in an example of Reference (2) in the Related Art List, a vibration-proof spring is formed by bending a wire for use with spring.

Related Art List (1) Japanese Unexamined Patent Application Publication (Kokai) No. 2004-293779 (e.g., FIG. 2).
(2) Japanese Unexamined Patent Application Publication (Kokai) No. Hei08-145505 (e.g., FIG. 6).

Nevertheless, the annular section must be made larger relative to the shaft because the support ring as disclosed in Reference (1) in the Related Art List is configured such that the plate-like bodies are cut out inwardly from the annular section to produce the spring. In other words, the vibration-proof spring becomes larger in its entirety, which may cause a problem due to the limited space available. Also, the vibration-proof spring as disclosed in Reference (2) in the Related Art List is formed by bending the wire, so that the rigidity is low and the spring tends to be bent along the direction of axis line. Thus it is not desirable to apply a sliding load to the shaft in a satisfactory manner.

SUMMARY OF THE INVENTION

The present invention has been made in view of the foregoing problems, and a purpose thereof is to configure an expansion valve such that a vibration-proof spring suitable in preventing the vibration of an actuating member of the expansion valve is of a reduced size while the function of the vibration-proof spring is secured.

In order to resolve the aforementioned problems, an expansion valve according to one embodiment of the present invention throttles and expands refrigerant introduced from an upstream side of a refrigeration cycle by allowing the refrigerant to pass through a valve section in a body so as to deliver the refrigerant to a downstream side thereof, and the expansion valve includes: a refrigerant passage, formed in such a manner as to run through the body, having a lead-in port of the refrigerant at one end thereof and having a lead-out port of the refrigerant at the other end thereof; a valve hole provided midway along the refrigerant passage; a valve element configured to open and close the valve section by touching and leaving the valve hole; a drive section configured to generate drive force used to open and close the valve section; an actuating rod, supported by the body, configured to transmit the drive force of the drive section to the valve element; and a vibration-proof spring, set between the body and the actuating rod, configured to develop a sliding friction by biasing the actuating rod. The vibration-proof spring includes: a spring body, of a hollow tube shape (cylindrical shape), inside which the actuating rod is insertable; a spring part integrally formed with a side wall of the spring body, the spring part being supported by the spring body; and a contact portion formed on the spring part in a protruding manner such that a tip of the contact portion is disposed opposite to a part of the actuating rod corresponding to the spring part, wherein, when the contact portion abuts against the actuating rod inserted to the vibration-proof spring, the spring part is placed in a position along the spring body or is warped outwardly from the spring body and an elastically reactive force resulting from the warped spring part allows the actuating rod to slide in a stabilized manner.

By employing this embodiment, an appropriate sliding friction is added to the actuating rod through the vibration-proof spring. As a result, the vibration of the valve element connected to the actuating rod can be inhibited. The spring part is formed by a part of the side wall constituting the cylindrical body of the vibration-proof spring and therefore the spring part can have a sufficient width. As a result, the spring part can have a sufficient and appropriate elasticity, which in turn exerts a sufficient sliding load on the actuating rod. In particular, the spring part is kept at a position along the spring body or at a position slightly outwardly from the spring body when the actuating rod is inserted to the vibration-proof spring. Hence, the spring body can be so configured as to have a necessary and sufficient size. That is, the vibration-proof spring can be constructed such that it is of a reduced and compact size as a whole.

Another embodiment of the present invention relates to a vibration-proof spring. The vibration-proof spring includes: a spring body of a hollow tube shape (cylindrical shape); a spring part integrally formed with a side wall of the spring body, the spring part being supported by the spring body; and a contact portion formed inwardly on the spring part from the spring body in a protruding manner, wherein, in an unloaded condition, the spring part is positioned in a position along the spring body or in a position outwardly from the body, and the contact portion is constructed such that an end surface of the contact portion protrudes inwardly from the spring body.

By employing this embodiment, the spring part is formed by a part of the side wall constituting the cylindrical body of the vibration-proof spring and therefore the spring part can have a sufficient width. As a result, the spring part can have a sufficient and appropriate elasticity, which in turn exerts a sufficient sliding load on a member inserted inside the spring part. In particular, in an unloaded condition, the spring part is positioned in a position along the spring body or in a position outwardly from the spring body, whereas the contact portion is constructed such that the end surface of the contact portion protrudes inwardly from the spring body. Thus, the spring part is kept at a position along the spring body or at a position slightly outwardly from the spring body when the actuating rod is inserted to the vibration-proof spring. Hence, the spring body can be so configured as to have a necessary and sufficient size. That is, the vibration-proof spring can be constructed such that it is of a reduced and compact size as a whole.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

Figure 1:
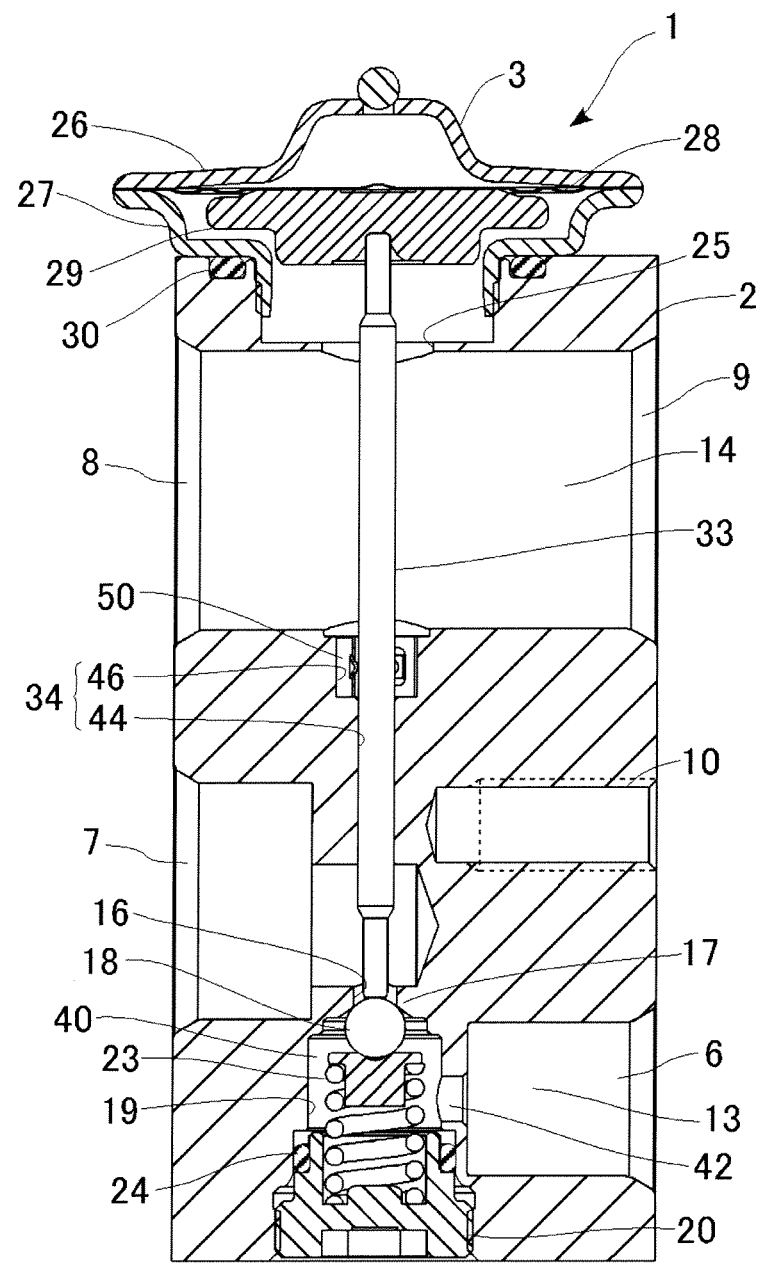
FIG. 1 is a cross-sectional view of an expansion valve according to a first embodiment of the present invention.

The present invention will now be described in detail based on preferred embodiments with reference to the accompanying drawings. This does not intend to limit the scope of the present invention, but to exemplify the invention. All of the features and the combinations thereof described in the embodiment are not necessarily essential to the invention.

In the following description, for convenience of description, the positional relationship in each structure may be expressed as "vertical" or "up-down" with reference to how each structure is depicted in Figures. Note that the almost identical components are given the identical reference numerals in the following embodiments and their modifications and that the repeated description thereof will be omitted as appropriate.

First Embodiment

The present embodiment is a constructive reduction to practice of the present invention where an expansion valve according to the preferred embodiments is used as a thermostatic expansion valve applied to a refrigeration cycle of an automotive air conditioner. The refrigeration cycle in the automotive air conditioner is configured by including a compressor, a condenser, a receiver, an expansion valve, and an evaporator. Here, the compressor compresses a circulating refrigerant. The condenser condenses the compressed refrigerant. The receiver separates the condensed refrigerant into a gas and a liquid. The expansion valve throttles and expands the separated liquid refrigerant and delivers it by turning it into a spray. The evaporator evaporates the misty refrigerant and thereby cools the air inside a vehicle by the evaporative latent heat. A detailed description of each component in this refrigerant cycle is omitted in the following except for the expansion valve.

FIG. 1 is a cross-sectional view of an expansion valve according to a first embodiment of the present invention. An expansion valve 1 has a body 2 formed such that a member, which has been formed such that a raw material made of an aluminum alloy undergoes extrusion molding, is subjected to a predetermined cutting work. This body 2, which is prismatic in shape, is provided with a valve section. This valve section, which throttles and expands a refrigerant, is formed inside the body 2. A power element 3, which functions as a temperature-sensing section, is provided at a longitudinal end of the body 2. Here, the temperature-sensing section is a drive section that senses the temperatures and then becomes activated.

The body 2 has sides formed with a lead-in port 6, a lead-out port 7, a lead-in port 8, and a lead-out port 9. The lead-in port 6 receives a high-temperature and high-pressure liquid refrigerant from a receiver side (condenser side). The lead-out port 7 supplies a low-temperature and low-pressure refrigerant, which is throttled and expanded by the expansion valve 1, to the evaporator. The lead-in port 8 receives the refrigerant evaporated by the evaporator. The lead-out port 9 returns the refrigerant, which has passed through the expansion valve 1, to the compressor. A screw hole 10, through which a not-shown stud bolt used to mount the piping can be studded, is formed between the lead-in port 6 and the lead-out port 9.

In the expansion valve 1, a first passage 13 is configured by the lead-in port 6, the lead-out port 7, and a refrigerant passage connecting the port 6 and the port 7. A valve section is provided in a middle part of the first passage 13. The refrigerant introduced from the lead-in port 6 is throttled and expanded through this valve section and then turned into a spray so as to be supplied to the evaporator from the lead-out port 7. Also, a second passage 14, which corresponds to "return passage", is configured by the lead-in port 8, the lead-out port 9, and a refrigerant passage connecting the port 8 and the port 9. The second passage 14 extends straight, and the refrigerant is led in from the lead-in port 8 and delivered to the compressor through this second passage 14.

In other words, a valve hole 16 is provided in a middle part of the first passage 13 in the body 2, and a valve seat 17 is formed by an opening end edge on an lead-in port 6 side of the valve hole 16. A valve element 18 is so placed as to face the valve seat 17 from a lead-in port 6 side. The valve element 18 is constructed such that a spherical ball valve element, which opens and closes the valve section by touching and leaving the valve seat 17, is joined to a valve element support that supports the ball valve element from below.

In a lower end part of the body 2, a communication hole 19, which communicates to and from the body 2, is formed in a direction orthogonal to the first passage 13, and a valve chamber 40, which houses the valve element 18, is formed by an upper half of the communication hole 19. The valve chamber 40 communicates to the valve hole 16 at an upper end of the valve chamber 40, whereas the valve chamber 40 communicates to the lead-in port 6 on a lateral side of the vale chamber 40 and constitutes a part of the first communication passage 13. The small hole 42 is formed such that the cross section of part of the first communication passage 13 is locally narrowed down, and the small hole 42 is open into the valve chamber 40.

In a lower half of the communication hole 19, an adjustment screw 20 (which corresponds to "adjustment member") is screwed in such a manner as to seal the communication hole 19 from the outside. A spring 23, which biases the valve element 18 in a valve closing direction, is set between the valve element 18 (more precisely, the valve element support) and the adjustment screw 20. The spring load of the spring 23 can be adjusted by a screwing amount of the adjustment screw 20 into the body 2. An O-ring 24 used to prevent the leakage of refrigerant is set between the adjustment screw 20 and the body 2.

In an upper end part of the body 2, a communication hole 25, which communicates to and from the body 2, is formed in a direction orthogonal to the second passage 14, and the power element 3 (which corresponds to "temperature-sensing section") is screwed in such a manner as to seal the communication hole 25. The power element 3 is configured such that a diaphragm 28 formed of a sheet metal is held between an upper housing 26 and a lower housing 27 and such that a disk 29 is disposed on a lower housing 27 side. A gas used to sense the temperature is filled and sealed in a hermetically sealed space enclosed by the upper housing 26 and the diaphragm 28. An O-ring 30 by which to prevent the leakage of refrigerant is set between the power element 3 and the body 2. The pressure and temperature of refrigerant passing through the second passage 14 are transmitted to the underside of the diaphragm 28 by way of the communication hole 25 and grooves provided in the disk 29.

A stepped hole 34 that connects the first passage 13 to the second passage 14 is provided in a central part of the body 2, and an elongated shaft 33 (which functions as an "actuating rod") is slidably inserted into a smaller-diameter part 44 of the stepped hole 34. The shaft 33 is set between the disk 29 and the valve element 18. With this arrangement, a drive force generated by a displacement of the diaphragm 28 is transmitted to the valve element 18 so as to open and close the valve section.

An upper half of the shaft 33 moves across the second passage 14, whereas a lower half of the shaft 33 slidably penetrates the smaller-diameter part 44 of the stepped hole 34. A vibration-proof spring 50, by which to exert a biasing force in a direction vertical to the direction of axis line on the shaft 33, namely by which to exert a lateral load (sliding load) on the shaft 33, is placed in a larger-diameter part 46 of the stepped hole 34 (the larger-diameter part 46 corresponding to "hole section"). As the shaft 33 receives the lateral load of the vibration-proof spring 50, the vibration of the shaft 33 and the valve element 18 produced by a displacement developed by the refrigerant pressure is suppressed or inhibited. A detailed structure of the vibration-proof spring 50 will be described later.

The expansion valve 1 as configured above senses the pressure and the temperature of the refrigerant that has been brought back from the evaporator via the lead-in port 8 and thereby the diaphragm 28 develops a displacement. The displacement developed by the diaphragm 28 becomes the drive force and is then transmitted to the valve element 18 via the disk 29 and the shaft 33, thereby opening and closing the valve section. Also, the liquid refrigerant supplied from the receiver is introduced from the lead-in port 6 and then passes through the valve section. Having thus passing through the valve section throttles and expands the liquid refrigerant, thereby turned it into a low-temperature and low-pressure misty refrigerant. This misty refrigerant is delivered toward the evaporator from the lead-out port 7.

Figure 2A:
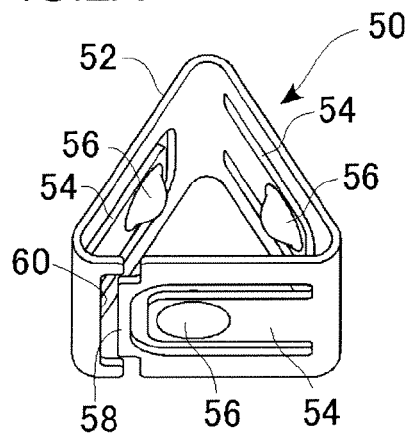
FIGS. 2A to 2F each shows a structure of a vibration-proof spring.
Figure 2D:
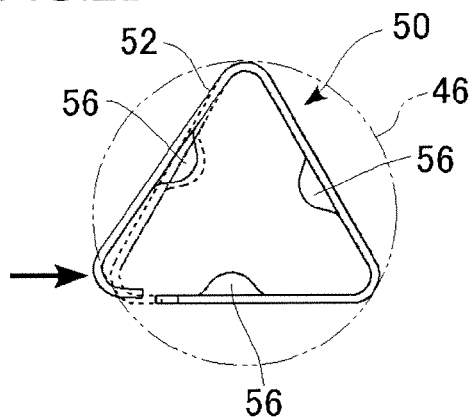
Figure 2B:
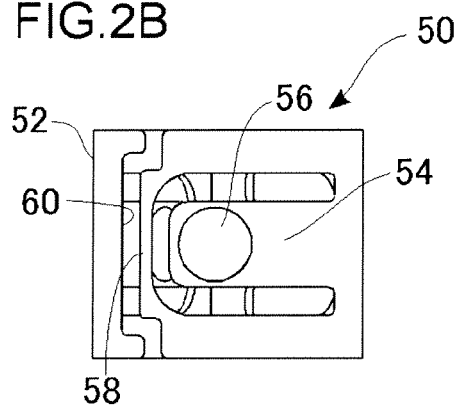
Figure 2E:
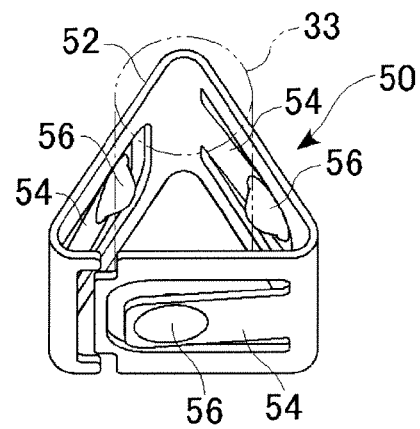
Figure 2C:
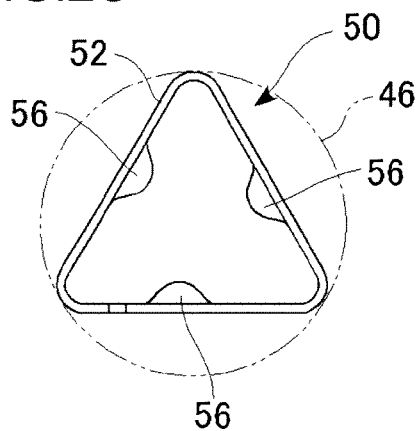
Figure 2F:
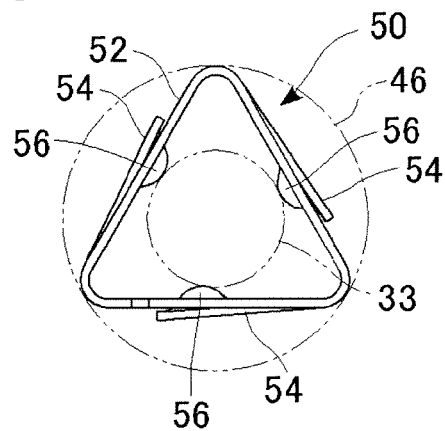

A description is now given of a specific structure of the vibration-proof spring 50. FIGS. 2A to 2F each shows a structure of a vibration-proof spring. FIG. 2A is a perspective view showing an overall structure of the vibration-proof spring. FIG. 2B is a front view of the vibration-proof spring. FIG. 2C is a plain view showing a state where the vibration-proof spring is inserted to a stepped hole. FIG. 2D is a plain view showing a state where the vibration-proof spring is in an unloaded condition. FIG. 2E is a perspective view showing a state of a shaft when the shaft is inserted to the vibration-proof spring. FIG. 2F is a plain view showing a state of the vibration-proof spring when the shaft is inserted to the vibration-proof spring.

As shown in FIGS. 2A to 2C, the vibration-proof spring 50 has a body 52, of a hollow triangular tube shape in cross section, with flat side walls and spring parts 54 integrally formed with their respective side walls. The spring part 54 is constructed by a residue part obtained after each side wall of the body 52 has been punched into a U-shape profile. Further, the spring part 54 is constructed such that a base end section of the spring part 54 is supported (cantilevered) by the body 52 and such that a tip of the spring part 54 extends circumferentially along the side wall. In a tip of the spring part 54, a semispherical bulging portion 56 (which corresponds to "contact portion") is formed inwardly on the spring part 54 in a protruding manner.

The vibration-proof spring 50 is formed such that a band-like plate is bent and processed at three positions along an extending direction. Thus there is a slit in a side wall where both ends of a single plate bent are disposed opposite to each other. In the present embodiment, as shown in FIGS. 2A to 2F, one end 58 of plate is of a projected shape and the other end 60 thereof is of a recessed shape, which is the complementary shape of the projected shape. Thereby, the plate is constructed in a stepped form such that the both ends 58 and 60 thereof overlap with each other in the width direction. This structure makes it more difficult to other members be caught in a gap between the both ends 58 and 60. In other words, it is assumed herein that in the distribution processes, instead of a single unit of vibration-proof spring 50, a plurality vibration-proof springs 50 are packed in one box, for instance. This helps a plurality of vibration-proof springs 50 easily handled in packing them so that the plurality of vibration-proof springs 50 are not entangled with each other in such a situation.

The vibration-proof spring 50 is formed such that the band-like plate made of metal, having a high elasticity, such as stainless, is bent and processed at three positions along the extending direction. More specifically, the plate is subjected to a press-forming so as to form it in the projected and recessed shapes at the both ends of the plate, and three spring parts 54 are formed in positions corresponding to their three respective side walls. At this time, the bulging portion 56 is formed on each spring part 54 by the press-forming. Then the plate is bent, by a so-called forming processing, between the adjacent spring parts 54, so as to form the bent plate in the triangular tube shape.

In an unloaded state where the vibration-proof spring 50 is not yet inserted to the larger-diameter part 46, as shown in FIG. 2D, a corner of the plate where the both ends of the plate are located is placed slightly outwardly, so that the vibration-proof spring 50 is a non-equilateral triangle in shape. Also, each spring part 54 is in a position along the side wall of the body 52. When the vibration-proof spring 50 is inserted to the larger-diameter part 46, a load is placed such that the both ends of the plate come closer to each other (see the arrow in FIG. 2D) and then the vibration-proof spring 50 is inserted thereto when the shape of the vibration-proof spring 50 is close to an equilateral triangle. The vibration-proof spring 50 is inserted to the larger-diameter part 46 while it is elastically deformed from the unloaded state. Thus, as shown in FIG. 2C, the vibration-proof spring 50 is secured firmly to the larger-diameter part 46 (i.e., the body 2) by an elastically reactive force produced when the load is released.

When, on the other hand, the vibration-proof spring 50 is inserted to the larger-diameter part 46, the three spring parts 54 produce a lateral load toward the shaft 33. That is, the vibration-proof spring 50 is configured as follows. Assume that, as shown in FIG. 2C, the three spring parts 54 are positioned coplanar with their side walls while the vibration-proof spring 50 is inserted to the larger-diameter part 46. Then the vibration-proof spring 50 is configured such that the diameter of an inscribed circle, inscribing the three bulging portions 56, which passes the tips of the three bulging portions 56 is smaller than that of the shaft 33. Accordingly, as shown in FIGS. 2E and 2F, while the shaft 33 is inserted to the vibration-proof spring 50, the bulging portions 56 are in contact with the shaft 33 and thereby the spring parts 54 are bent or warped outwardly from the body 52. Thereby, a suitable sliding force resulting from an elastically reactive force of the warped spring parts 54 is exerted on the shaft 33; that is, this elastically reactive force allows the shaft 33 to slide in a stabilized manner. Also, if the shaft 33 is inserted to the vibration-proof spring 50 in this manner, the spring parts 54 can be warped outwardly from the body 52 using a gap formed between the body 52 and the larger-diameter part 46. Thus, the shape, the size and the elasticity of the spring part 54 may be selected so that an appropriate sliding force resulting from the elastically reactive force can be exerted on the shaft 33. If the shaft 33 is inserted to the vibration-proof spring 50 in this manner, the spring parts 54 will be warped radially; if, in this case, the spring parts 54 are plastic-deformed to a certain degree, the pressing force of the spring parts 54 to the shaft 33 (i.e., the sliding force in between the bulging portions 56 and the shaft 33) can be stabilized. In other words, the spring part 54 may be used in an elastic region or in a plastic region.

Note that if the vibration-proof spring 50 is inserted to the larger-diameter part 46 as shown in FIGS. 2E and 2F, the three bulging portions 56 will touch the shaft 33 at three points, namely the three bulging portions 56 will be in point-contact with the shaft 33. This structure constantly ensures the point-contact state of the bulging portions 56 and the shaft 33 even though the shaft 33 is slightly tilted, for instance. Hence, the smooth support condition by the vibration-proof spring can be maintained.

By employing the expansion valve 1, as described above, according to the first embodiment, an appropriate sliding friction can be added to shaft 33 through the vibration-proof spring 50. As a result, the vibration of the shaft 33 and the valve element 18 associated with the fluctuation in the pressure of refrigerant can be inhibited. In particular, the spring parts 54 are kept at the positions slightly outwardly from the body 52 when the shaft 33 is inserted to the vibration-proof spring 50. Hence, the body 52 can be so configured as to have a necessary and sufficient size. That is, the vibration-proof spring 50 can be constructed such that it is of a reduced and compact size as a whole.

Second Embodiment

Figure 3A:
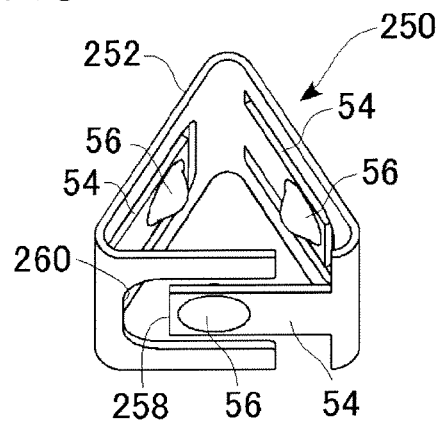
FIGS. 3A to 3E each shows a structure of a vibration-proof spring according to a second embodiment.
Figure 3D:
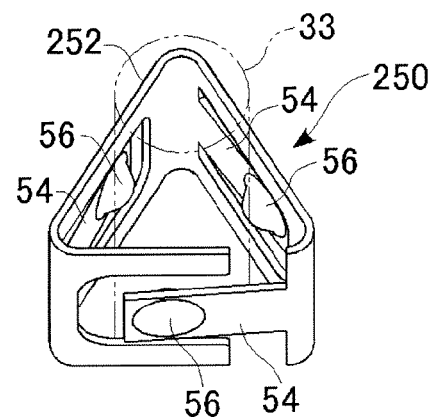
Figure 3B:
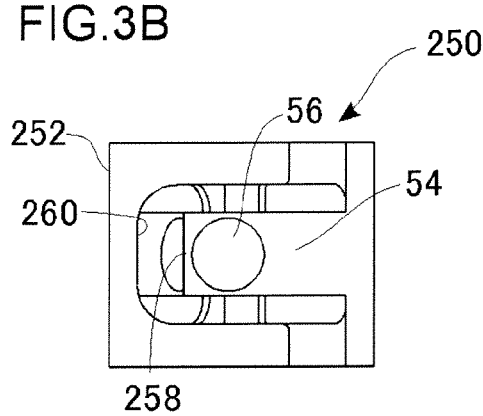
Figure 3E:
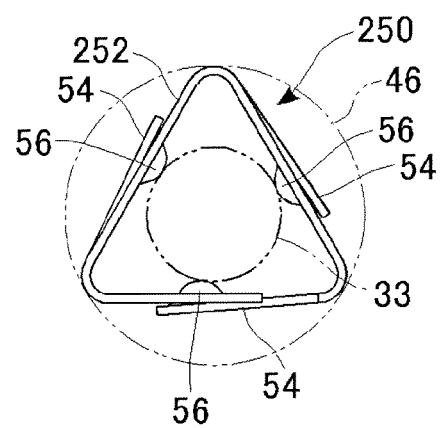
Figure 3C:
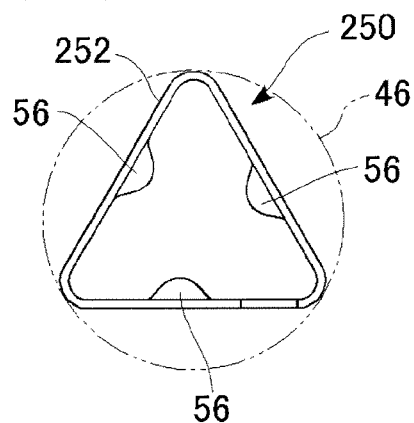

An expansion valve according to a second embodiment is similar to the first embodiment in structure and arrangement excepting that the structure around the spring part in the vibration-proof spring according to the second embodiment differs from that of the first embodiment. FIGS. 3A to 3E each shows a structure of a vibration-proof spring according to the second embodiment. FIG. 3A is a perspective view showing an overall structure of the vibration-proof spring. FIG. 3B is a front view of the vibration-proof spring. FIG. 3C is a plain view showing a state where the vibration-proof spring is inserted to a stepped hole. FIG. 3D is a perspective view showing a state of the shaft when the shaft is inserted to the vibration-proof spring. FIG. 3E is a plain view showing a state of the vibration-proof spring when the shaft is inserted to the vibration-proof spring.

As shown in FIGS. 3A to 3C, a vibration-proof spring 250 according to the second embodiment is configured such that one of the spring parts 54 forms one end 258 of a body 252 and such that said one end 258 thereof has a projected shape. The other end 260 of the body 252 is of a recessed shape the size of which is larger than that of the other end 60 of the first embodiment. Thereby, the plate is constructed in a stepped form such that the both ends 258 and 260 overlap with each other in the width direction. As compared with the body 52 of the first embodiment, the body 252 of the second embodiment has a simpler structure.

Third Embodiment

Figure 4A:
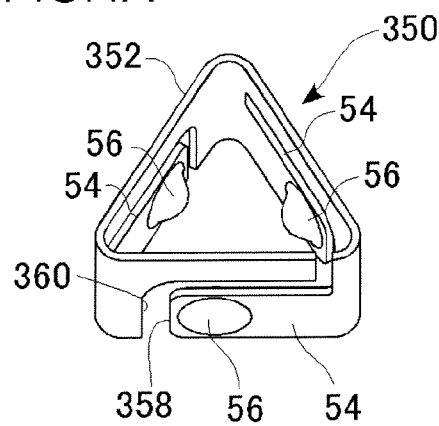
FIGS. 4A to 4E each shows a structure of a vibration-proof spring according to a third embodiment.
Figure 4D:
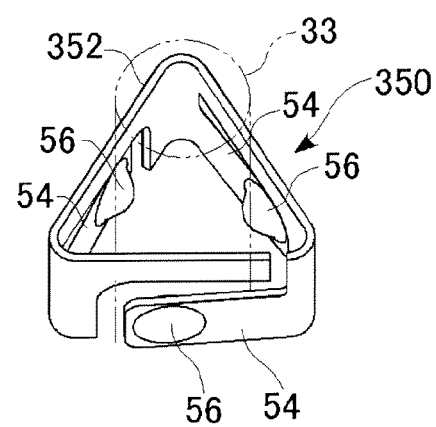
Figure 4B:
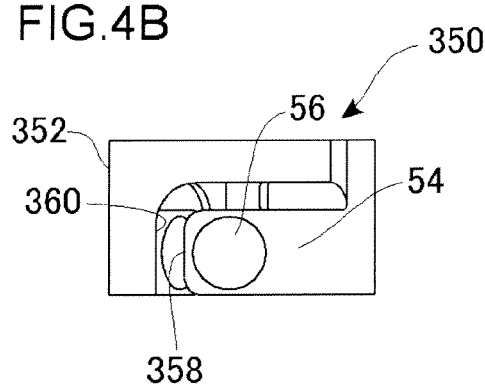
Figure 4E:
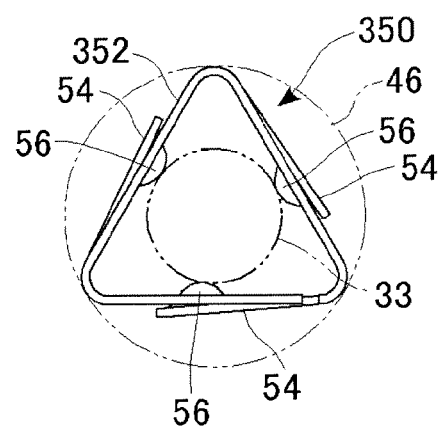
Figure 4C:
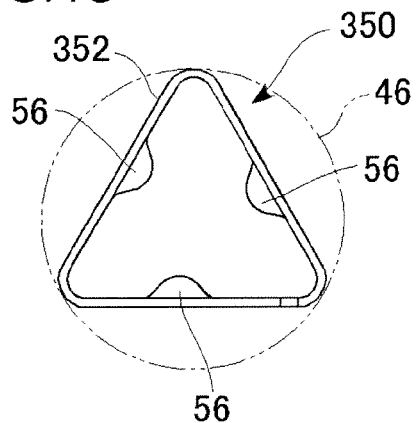

An expansion valve according to a third embodiment is similar to the first and second embodiments in structure and arrangement excepting that the structure around the spring part in the vibration-proof spring according to the third embodiment differs from those of the first and second embodiments. FIGS. 4A to 4E each shows a structure of a vibration-proof spring according to the third embodiment. FIG. 4A is a perspective view showing an overall structure of the vibration-proof spring. FIG. 4B is a front view of the vibration-proof spring. FIG. 4C is a plain view showing a state where the vibration-proof spring is inserted to a stepped hole. FIG. 4D is a perspective view showing a state of the shaft when the shaft is inserted to the vibration-proof spring. FIG. 4E is a plain view showing a state of the vibration-proof spring when the shaft is inserted to the vibration-proof spring.

The vibration-proof spring 350 according to the third embodiment is configured such that a lower part of the body 252 in the vibration-proof spring 250 of the second embodiment is removed. In other words, the other end 360 of a body 352 is an L-shaped recess and therefore the width of the body 352 is smaller by an area corresponding to the lower part thereof removed. In such a structure of the third embodiment as described above and depicted in FIGS. 4A to 4E, a stepped shape where one end 358 of the body 352 and the other end 360 overlap with each other. By employing the third embodiment, the width (height) of the body 352 can be reduced, so that the vibration-proof spring 350 can be constructed such that it is of a reduced and compact size as a whole.

Fourth Embodiment

Figure 5A:
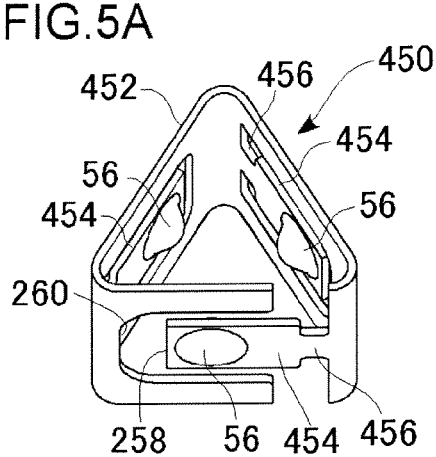
FIGS. 5A to 5E each shows a structure of a vibration-proof spring according to a fourth embodiment.
Figure 5D:
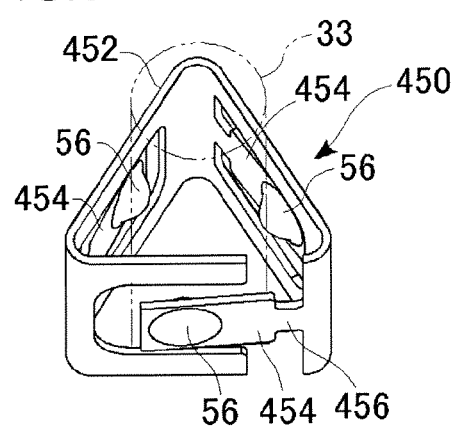
Figure 5B:
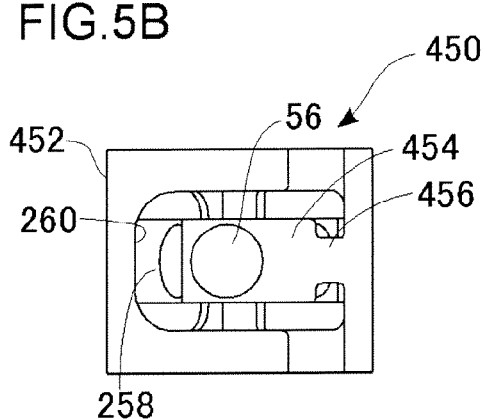
Figure 5E:
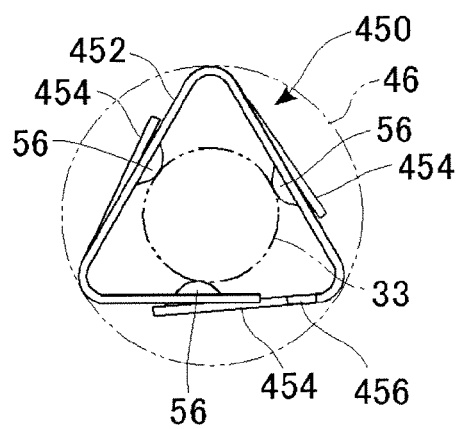
Figure 5C:
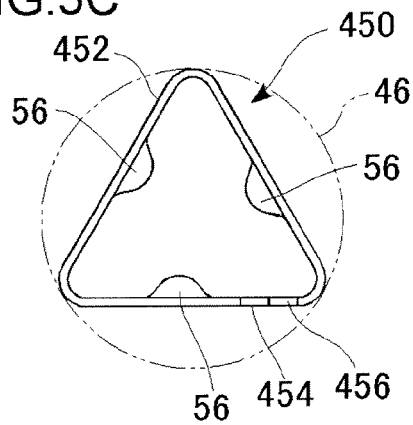

An expansion valve according to a fourth embodiment is similar to the first to third embodiments in structure and arrangement excepting that the structure around the spring part in the vibration-proof spring according to the fourth embodiment differs from those of the first to third embodiments. FIGS. 5A to 5E each shows a structure of a vibration-proof spring according to the fourth embodiment. FIG. 5A is a perspective view showing an overall structure of the vibration-proof spring. FIG. 5B is a front view of the vibration-proof spring. FIG. 5C is a plain view showing a state where the vibration-proof spring is inserted to a stepped hole. FIG. 5D is a perspective view showing a state of the shaft when the shaft is inserted to the vibration-proof spring. FIG. 5E is a plain view showing a state of the vibration-proof spring when the shaft is inserted to the vibration-proof spring.

Different from the vibration-proof spring 250 of the second embodiment, the vibration-proof spring 450 according to the fourth embodiment is configured such that a narrow constriction 456 is provided at a base end section of a spring part 454, wherein the base end section of the spring part 454 is formed connectedly to a body 452. Thereby, the load exerted on the shaft 33 is made smaller than that of the second embodiment, so that an appropriate sliding load is applied to the shaft 33. As described above, the plate width in a direction vertical to the extending direction of the spring part 454 is partially varied, so that the biasing force exerted on the shaft 33 can be adjusted.

Fifth Embodiment

Figure 6A:
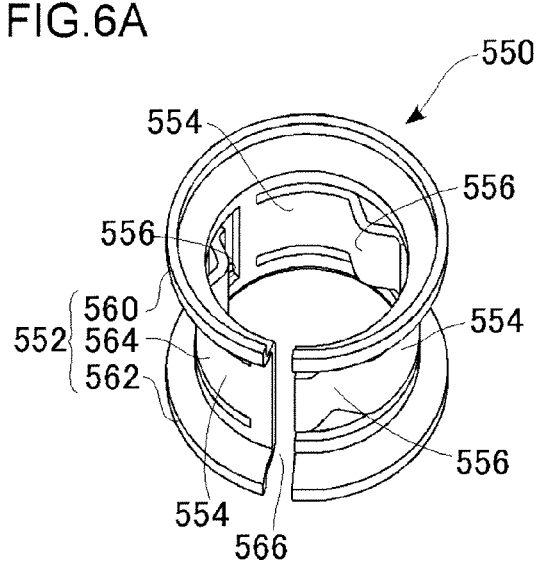
FIGS. 6A to 6D each shows a structure of a vibration-proof spring according to a fifth embodiment.
Figure 6C:
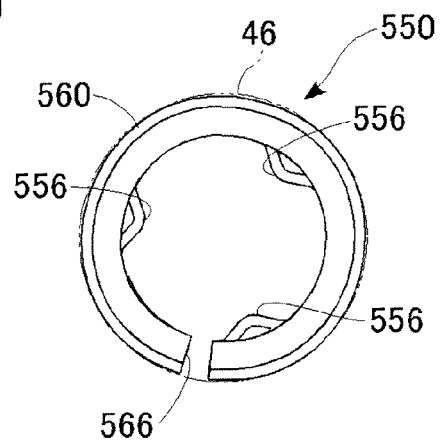
Figure 6B:
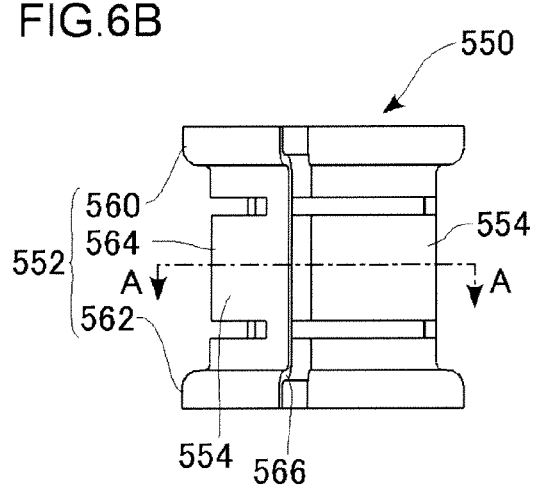
Figure 6D:
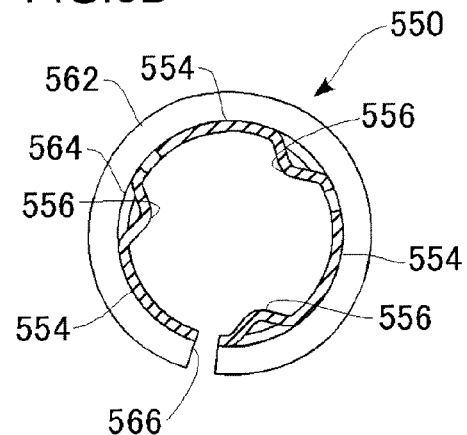

An expansion valve according to a fifth embodiment is similar to the first to fourth embodiments in structure and arrangement excepting that the structure around the spring part in the vibration-proof spring according to the fifth embodiment differs from those of the first to fourth embodiments. FIGS. 6A to 6D each shows a structure of a vibration-proof spring according to the fifth embodiment. FIG. 6A is a perspective view showing an overall structure of the vibration-proof spring. FIG. 6B is a front view of the vibration-proof spring. FIG. 6C is a plain view showing a state where the vibration-proof spring is inserted to a stepped hole. FIG. 6D is a cross-sectional view taken along the line A-A and viewed on the side shown by the arrows of FIG. 6B.

A vibration-proof spring 550 according to the fifth embodiment is of a stepped cylindrical shape. Fixed portions 560 and 562 both having large diameters are provided at one end and the other end of a body 552, respectively. A support section 564 having a small diameter is formed connectedly with and between the fixed portions 560 and 562. Three spring parts 554 are disposed in three positions circumferentially along the support section 564. A bulging portion 556, which is curved radially inward, is formed in the vicinity of a leading end of the spring part 554. In other words, a tip of the spring part 554 is of a corrugated shape; a front end edge of the bulging portion 556 is positioned along a side wall of the support section 564 while the bulging portion 556 protrudes inwardly in an unloaded condition.

The vibration-proof spring 550 is a resin spring produced through the injection molding of glass-reinforced polyphenylene sulfide (PPS). In a modification, the injection molding may be carried out using another resin material or a metallic plate may be formed similarly to the first to fourth embodiments. At one spot of side wall of the body 552 there is a slit 566 extending in the width direction. The slit 566 is slightly opened in an unloaded state where the vibration-proof spring 550 is not yet inserted to the larger-diameter part 46. Each spring part 554 is in a position along the side wall of the body 552. When the vibration-proof spring 550 is inserted to the larger-diameter part 46, a load is placed such that the interval of the slit 566 is small. The vibration-proof spring 550 is inserted to the larger-diameter part 46 while it is elastically deformed from the unloaded state. Thus the vibration-proof spring 550 is secured firmly to the larger-diameter part 46 (i.e., the body 2) by an elastically reactive force produced when the load is released.

When, on the other hand, the vibration-proof spring 550 is inserted to the larger-diameter part 46, the three spring parts 554 produce the lateral load toward the shaft 33. That is, while the shaft 33 is inserted to the vibration-proof spring 550, the bulging portions 556 are in contact with the shaft 33 and thereby the spring parts 554 are bent or warped outwardly from the support section 564. Thereby, a suitable sliding force resulting from an elastically reactive force of the warped spring parts 554 is exerted on the shaft 33; that is, this elastically reactive force allows the shaft 33 to slide in a stabilized manner. Also, if the shaft 33 is inserted to the vibration-proof spring 550 in this manner, the spring parts 554 can be warped outwardly from the body 552 using a gap formed between the support section 564 and the larger-diameter part 46. Thus, the shape, the size and the elasticity of the spring part 554 may be selected so that an appropriate sliding force resulting from the elastically reactive force can be exerted on the shaft 33.

The vibration-proof spring 550 according to the fifth embodiment is configured such that the body 552 of the vibration-proof spring 550 is constructed in cylindrical shape whose cross section is circle. Thus, the outer periphery of the fixed portions 560 and 562 is in a surface-to-surface contact state with the inner periphery of the larger-diameter part 46. Hence, the vibration-proof spring 550 is further stably supported by the body 2.

Sixth Embodiment

Figure 7A:
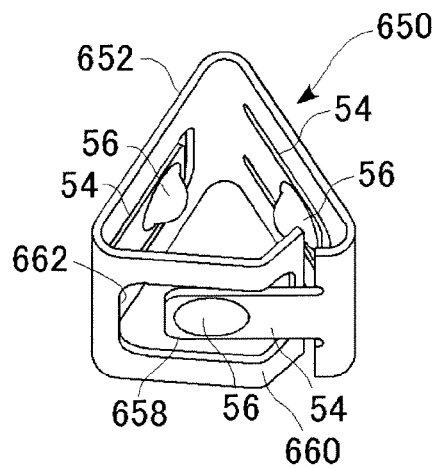
FIGS. 7A to 7F each shows a structure of a vibration-proof spring according to a sixth embodiment.
Figure 7D:
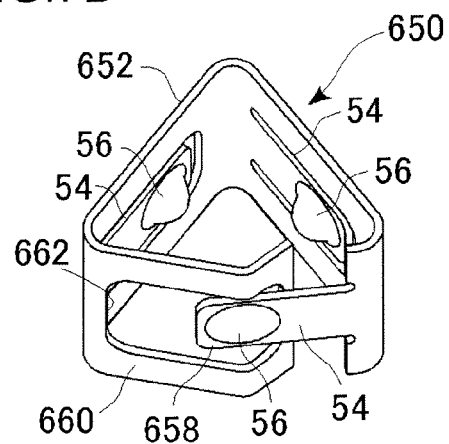
Figure 7B:
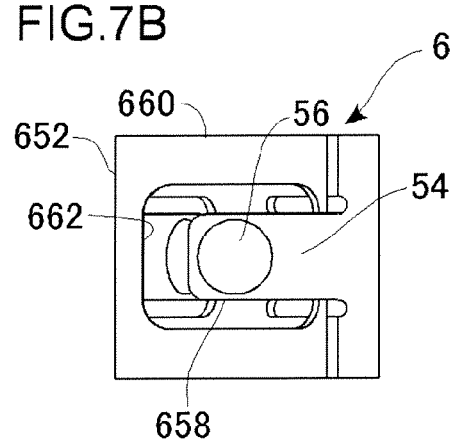
Figure 7E:
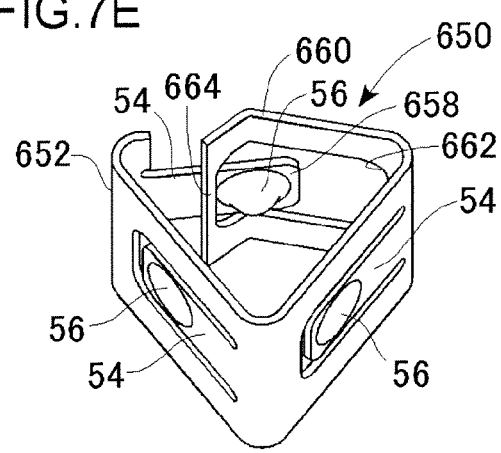
Figure 7C:
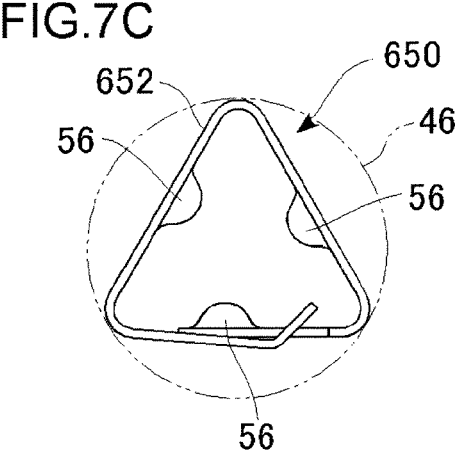
Figure 7F:
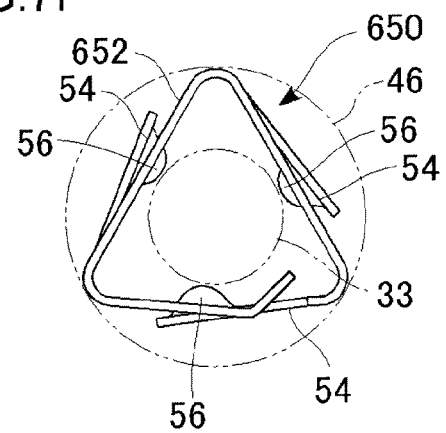

An expansion valve according to a sixth embodiment is similar to the first to fifth embodiments in structure and arrangement excepting that the structure around the spring part in the vibration-proof spring according to the sixth embodiment differs from those of the first to fifth embodiments. FIGS. 7A to 7F each shows a structure of a vibration-proof spring according to the sixth embodiment. FIG. 7A is a perspective view showing an overall structure of the vibration-proof spring. FIG. 7B is a front view of the vibration-proof spring. FIG. 7C is a plain view showing a state where the vibration-proof spring is inserted to a stepped hole. FIG. 7D is a perspective view of the vibration-proof spring viewed from a front side when the vibration-proof spring is in an unloaded condition. FIG. 7E is a perspective view of the vibration-proof spring viewed from a back side when the vibration-proof spring is in an unloaded condition. FIG. 7F is a plain view showing a state of the vibration-proof spring when the shaft is inserted to the vibration-proof spring.

As shown in FIGS. 7A to 7C, a vibration-proof spring 650 according to the sixth embodiment is configured such that one of the spring parts 54 forms one end 658 of a body 652 and such that said one end 658 thereof has a projected shape. The other end 660 of the body 652 has a rectangular opening 662, and a tip of the other end 660 is bent inward. The one end 658 is inserted to the opening 662 with the bent portion of the other end 660 as an inlet port and thereby the ends 658 and 660 overlap with each other. As shown in FIGS. 7D and 7E, the tip of the one end 658 and the tip of the other end 660 are still overlapped with each other although the both ends 658 and 660 of the body 652 are slightly warped outwardly when the vibration-proof spring 650 is in an unloaded state.

In the sixth embodiment, a tip 664 of the other end 660 is an closed end. This structure makes it more difficult to other members be caught in a gap between the both ends 658 and 660 of the body 652. In other words, the sixth embodiment has a more powerful effect of preventing the entanglement, in the situations where a plurality of vibration-proof springs 650 are packed in bulk, than any other embodiments.

Seventh Embodiment

Figure 8A:
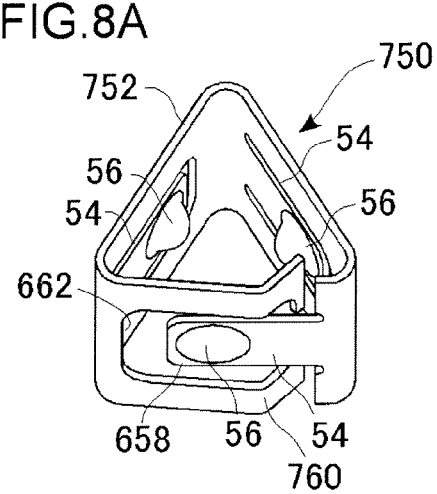
FIGS. 8A to 8F each shows a structure of a vibration-proof spring according to a seventh embodiment.
Figure 8D:
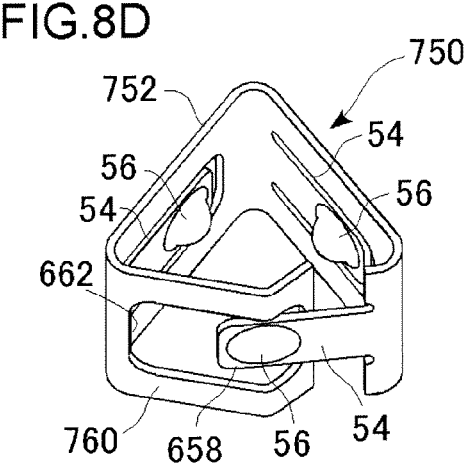
Figure 8B:
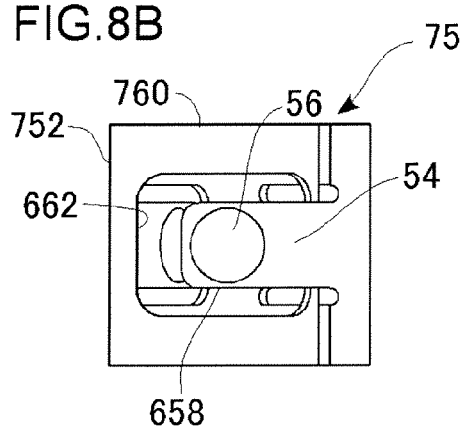
Figure 8E:
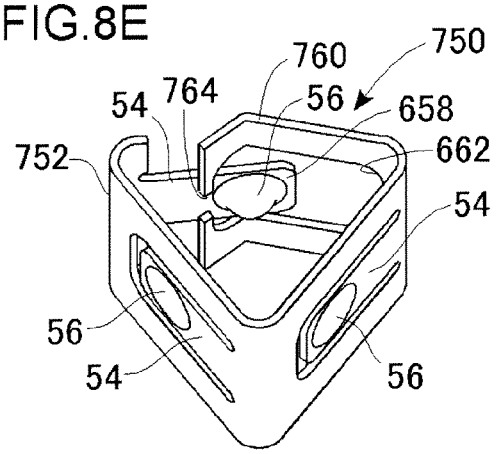
Figure 8C:
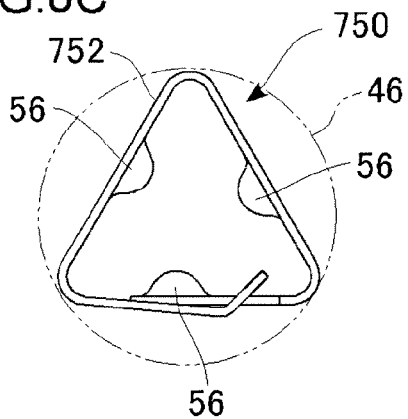
Figure 8F:
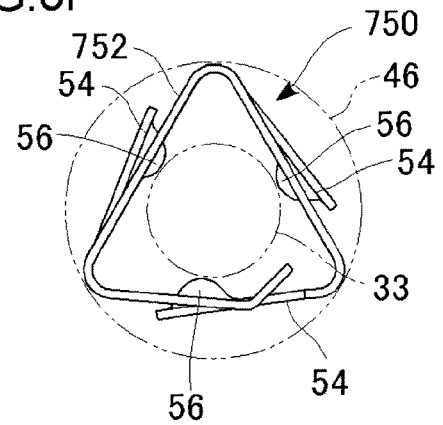

An expansion valve according to a seventh embodiment is similar to the first to sixth embodiments in structure and arrangement excepting that the structure around the spring part in the vibration-proof spring according to the seventh embodiment differs from those of the first to sixth embodiments. FIGS. 8A to 8F each shows a structure of a vibration-proof spring according to the seventh embodiment. FIG. 8A is a perspective view showing an overall structure of the vibration-proof spring. FIG. 8B is a front view of the vibration-proof spring. FIG. 8C is a plain view showing a state where the vibration-proof spring is inserted to a stepped hole. FIG. 8D is a perspective view of the vibration-proof spring viewed from a front side when the vibration-proof spring is in an unloaded condition. FIG. 8E is a perspective view of the vibration-proof spring viewed from a back side when the vibration-proof spring is in an unloaded condition. FIG. 8F is a plain view showing a state of the vibration-proof spring when the shaft is inserted to the vibration-proof spring.

As shown in FIGS. 8A to 8F, a vibration-proof spring 750 is similar to the vibration-proof spring 650 of the sixth embodiment excepting that the structure of the other end 760 of a body 752 of the seventh embodiment differs slightly from the structure of the other end 660 of the sixth embodiment. That is, as shown in FIG. 8E, a tip of the other end 760 is partially open and the other end 760 has a slit 764.

However, the width of this slit 764 is set to a value equal to or less than the width of the spring part 54, which is one end 658 of the body 752. Thus, when the one end 658 and the other end 760 are fit to each other with no load applied to the vibration-proof spring 750, the slit 764 is substantially closed. In this manner, similar to the sixth embodiment, the vibration-proof spring 750 according to the seventh embodiment is configured such that when an overlapping section of the one end 658 and the other end 760 of the body 752 is viewed laterally (viewed from the front), an area, where there is no gap is in the width direction of the body 752, is formed (see FIG. 8B) by the one end 658 and the other end 760. This structure further enhances the efficiency of preventing the entanglement.

It should be noted here that the slit 764 (notch) may be one which is used to prevent the interference with the bulging portion 56 at the time the vibration-proof spring 750 is formed. Assume, for example, a process in which when a band-like plate is bent and processed at three positions along an extending direction so as to form the body 752, the two points near the both ends of the plate (i.e., the first position near the slit 764 and the second position near the spring part 54 engaged with the slit 764) are bent before a middle part (the third position) of the plate is bent. In the process of bending the middle part thereof, the width of the slit 764 may be set so that the interference with the other end 760 can be avoided by having a part nearer the tip of the bulging portion 56 pass through the slit 764. The width of the slit 764 may be smaller than the width of the spring part 54 and may be of a size such that the slit 764 does not interfere with the bulging portion 56 when the body 752 is formed.

The description of the present invention given above is based upon illustrative embodiments. These embodiments are intended to be illustrative only and it will be obvious to those skilled in the art that various modifications could be further developed within the technical idea underlying the present invention and that such additional modifications are also within the scope of the present invention. For example, in the above-described embodiments and modifications, part of components may be combined and part of components may be removed from each embodiment and modification.

In the above-described first to fourth embodiments, a semispherical shape is described as the shape of the bulging portion 56 but other forms and shapes such as an arch-like shape may be selected, as appropriate, so long as such a shape and form, which protrude inwardly, can exert an appropriate sliding force on the shaft 33. Also, in the above-described first to fourth embodiments, an example is described where the body of the vibration-proof spring is of a triangular shape in cross section. Instead, the shape and form of the body of the vibration-proof spring may be a rectangular or square shape or any other polygonal shape in cross section. Also, in the fifth embodiment, an example is described where the vibration-proof spring is of a stepped cylindrical shape. However, the shape thereof may be a polygonal shape in cross section, instead. Note that a polygonal shape is easier in the forming processing than the cylindrical shape and therefore the use of a polygonal shape make it possible to cut down the processing cost.

Though not mentioned in the above-described embodiments, a stopper may be formed, in a part in contact with the larger-diameter part 46 of the vibration-proof spring, in a manner such that the stopper protrudes outwardly and is stopped by the larger-diameter part 46 in an engaged manner. For example, the stopper may be formed such that an upper edge or lower edge of the body of the vibration-proof spring is partially cut out and then the thus cut-out part of the body thereof is bent outwardly. This structure can prevent the falling-off of the vibration-proof spring because when the vibration-proof spring is inserted to the larger-diameter part 46, the stopper is engaged with (stopped by) an inner wall of the larger-diameter part 46.

In the above-described fourth embodiment, an example is described where the width of the base end section of the spring part 454 is made small and thereby the biasing force exerted on the shaft 33 is adjusted. In a modification, the plate width of the spring part may be practically reduced by forming a hole or holes in a predetermined position or positions of the spring part. Such a structure as this also allows the biasing force exerted on the shaft 33 to be adjusted. As for the body, the reactive force to the body 2 may be adjusted by adjusting the plate width at a predetermined position or positions in the extending direction of the body.

In the above-described embodiments, the vibration-proof spring is configured such that the spring parts are provided along the side wall of the body while no load is applied to the vibration-proof spring and such that when the shaft is inserted, the spring parts are warped outwardly from the body. In a modification, the vibration-proof spring may be configured such that the spring parts extend inwardly from the body while no load is applied to the vibration-proof spring and such that when the shaft is inserted, the spring parts are warped at positions along the body. Or alternatively, the vibration-proof spring may be configured such that the spring parts extend inwardly from the body while no load is applied to the vibration-proof spring and such that when the shaft is inserted, the spring parts are warped outwardly from the body. In such a case, too, the bulging portions are positioned inwardly from the body.

It should be noted here that the structure, in which the spring parts are provided along the side wall of the body, is more advantageous than the modifications in terms of the processing cost. That is, according to the above-described embodiments, it is only necessary that a band-like plate is subjected to the press-forming, whereby the projected and recessed shapes at the both ends and the spring-part shapes are punched out of the plate into desired profiles, and the thus punched-out sections are bent along their outer shapes. Thus there is no need to cut out (bend) the spring parts inwardly or outwardly from the body for an appropriate amount. Since the process for cutting out or bending the spring parts is eliminated, the processing cost can be suppressed to the minimum.

Though not mentioned in the above-described embodiments, a sealing member such as an O-ring may be provided between the stepped hole 34 and the shaft 33 shown in FIG. 1 to prevent the refrigerant from being leaked from the first passage 13 to the second passage 14. More specifically, the depth of the large-diameter part 46 of the stepped hole 34 may be enlarged, an O-ring may be installed on a bottom side of the larger-diameter part 46, and the vibration-proof spring may be placed above the O-ring. In this case, the vibration-proof spring may function as a stopper that stops the O-ring from above through the medium of the bottom face constituting a folded-back point of the vibration-proof spring.

The expansion valves according to the above-described embodiments are suitably applied to and used for a refrigeration cycle where hydrochlorofluorocarbon (HFC-134a) or the like is used as the refrigerant. Also, the expansion valves according to the present embodiments and modifications may be applied to a refrigeration cycle where a refrigerant, such as carbon dioxide, whose working pressure is high is used. In such a case, an external heat-exchanger such as a gas cooler may be placed in the refrigerant cycle, instead of the condenser. In this case, a plurality of disk springs formed of a metal, for example, may be disposed in superposition for the purpose of reinforcing the diaphragm constituting the power element 3. Or alternatively, the disc springs or the like may be provided in place of the diaphragm. In the above-described embodiments, an example is described where the expansion valve is configured as a thermostatic expansion valve. However, the expansion valve according to the present embodiments may also be configured as one that does not sense the temperature. For example, the expansion valve may also be configured as an electromagnetic expansion valve that uses a solenoid as the drive section. Or alternatively, the expansion valve may also be configured as an electric expansion valve that uses a electric motor as the drive section.

While the preferred embodiments of the present invention have been described using specific terms, such description is for illustrative purposes only, and it is to be understood that changes and variations may be made without departing from the spirit or scope of the appended claims.

What is claimed is:

1. An expansion valve that throttles and expands refrigerant introduced from an upstream side of a refrigeration cycle by allowing the refrigerant to pass through a valve section in a body so as to deliver the refrigerant to a downstream side thereof, the expansion valve comprising:
   a refrigerant passage, formed in such a manner as to run through the body, having a lead-in port of the refrigerant at one end thereof and having a lead-out port of the refrigerant at the other end thereof;
   a valve hole provided midway along the refrigerant passage;
   a valve element configured to open and close the valve section by touching and leaving the valve hole;
   a drive section configured to generate drive force used to open and close the valve section;
   an actuating rod, supported by the body, configured to transmit the drive force of the drive section to the valve element; and
   a vibration-proof spring, set between the body and the actuating rod, configured to develop a sliding friction by biasing the actuating rod,
   the vibration-proof spring including:
      a spring body, of a hollow tube shape, inside which the actuating rod is insertable, the spring body having a plurality of flat side walls and having a polygonal cross section;
      a plurality of spring parts, each integrally formed with a respective one of the side walls of the spring body, the spring parts being supported by the spring body; and
      a plurality of contact portions, each formed on a face of a respective one of the spring parts in a protruding manner, the face facing the actuating rod,
   wherein, when the contact portions abut against the actuating rod inserted to the vibration-proof spring, the spring parts are warped to positions along the side walls of the spring body or to positions outside of the side walls of the spring body, and an elastically reactive force of the warped spring parts allows the actuating rod to slide in a stabilized manner,
   wherein each of the spring parts is located at a position of an opening formed in a respective one of the side walls and extends in a cantilevered manner along the side wall in a circumferential direction of the spring body, and the spring parts are in contact with the actuating rod at a plurality of positions, wherein the spring body is elastically inserted in a hole section having a circular cross section formed in the body, the hole section and the actuating rod are concentric, and the spring body is supported by the body through the elastically reactive force, and wherein gaps between the side walls of the spring body and an inner wall of the hole section constitute spaces allowing the spring parts to warp to the outside of the side walls.

2. An expansion valve according to claim 1, wherein the vibration-proof spring is configured such that the vibration-proof spring is mounted to the body while the spring body is elastically deformed and such that the vibration-proof spring is secured to the body by an elastically reactive force.

3. An expansion valve according to claim 1, wherein the spring body is formed of a hollow tube having a triangular cross section.

4. An expansion valve according to claim 1, wherein the spring body is formed such that an elastic plate is bent and processed along an extending direction, and the plate is constructed in a stepped form such that one end and the other end of the plate overlap with each other in a width direction.

5. An expansion valve according to claim 1, wherein the expansion valve is configured as a thermostatic expansion valve which delivers the throttled and expanded refrigerant, having passed through the valve section, from the lead-out port and supplies the throttled and expanded refrigerant to an evaporator and which controls a valve opening degree of the valve section by sensing a pressure and a temperature of the refrigerant returned from the evaporator, the thermostatic expansion valve including:
a return passage, formed separately from the refrigerant passage in such a manner as to run through the body, the return passage having the refrigerant returned from the evaporator pass therethrough; and
a power element, provided as the drive section, configured to be enabled upon sensing the temperature and the pressure of the refrigerant flowing through the return passage and configured to control a flow rate of refrigerant supplied to the evaporator by transmitting the drive force to the valve element via the actuating rod and varying the valve opening degree of the valve section.

6. A vibration-proof spring, which functions in a state inserted in a hole section having a circular cross section, for applying sliding friction to a member inserted in the vibration-proof spring, the vibration-proof spring comprising:
a spring body of a hollow tube shape having a plurality of flat side walls and having a polygonal cross section;
a plurality of spring parts, each integrally formed with a respective one of the side walls of the spring body, the spring parts being supported by the spring body in a cantilevered manner; and
a plurality of contact portions, each formed on a respective one of the spring parts, the contact portions protruding toward the inside of the spring body,
wherein each of the spring parts is located at a position of an opening formed in a respective one of the side walls and extends along the side wall in a circumferential direction of the spring body,
wherein, in a state where no load is applied to the spring parts, the spring parts are at positions along the side walls of the spring body or positions outside of the side walls of the spring body and end surfaces of the contact portions are at positions inside of the side walls.

* * * * *